United States Patent
Bretschneider et al.

(10) Patent No.: US 8,152,422 B2
(45) Date of Patent: Apr. 10, 2012

(54) CONTROL METHOD FOR A MACHINE TOOL WITH NUMERICAL CONTROL

(75) Inventors: Jochen Bretschneider, Esslingen (DE); Hans Vogler, Korntal (DE)

(73) Assignee: Siemens Aktiengesellschaft, Munich (DE)

( * ) Notice: Subject to any disclaimer, the term of this patent is extended or adjusted under 35 U.S.C. 154(b) by 889 days.

(21) Appl. No.: 11/631,770

(22) PCT Filed: Jul. 5, 2005

(86) PCT No.: PCT/EP2005/053206
§ 371 (c)(1), (2), (4) Date: Jan. 5, 2007

(87) PCT Pub. No.: WO2006/005700
PCT Pub. Date: Jan. 19, 2006

(65) Prior Publication Data
US 2007/0180962 A1    Aug. 9, 2007

(30) Foreign Application Priority Data
Jul. 8, 2004 (DE) .......... 10 2004 033 119

(51) Int. Cl.
*B23Q 17/00* (2006.01)
(52) U.S. Cl. .......... 409/193; 409/197; 409/220
(58) Field of Classification Search .......... 408/9–13; 409/193–197, 220
See application file for complete search history.

(56) References Cited

U.S. PATENT DOCUMENTS

| | | | |
|---|---|---|---|
| 4,620,281 A | 10/1986 | Thompson et al. | |
| 5,095,788 A * | 3/1992 | Matoni | 82/118 |
| 5,795,112 A | 8/1998 | Senda | |
| 7,056,072 B2 * | 6/2006 | Mizutani et al. | 409/131 |
| 7,328,082 B2 * | 2/2008 | Endo et al. | 700/186 |
| 7,426,876 B2 * | 9/2008 | Takaku | 73/862.21 |
| 7,539,595 B2 * | 5/2009 | Georgi et al. | 702/150 |
| 2002/0189120 A1 | 12/2002 | Kaneda et al. | |
| 2003/0103827 A1 | 6/2003 | Moller et al. | |

FOREIGN PATENT DOCUMENTS

| | | |
|---|---|---|
| DE | 42 03 994 A1 | 8/1993 |
| DE | 43 27 655 A1 | 2/1995 |
| DE | 44 19 393 A1 | 12/1995 |
| DE | 196 38 607 A1 | 4/1997 |
| DE | 100 07 126 A1 | 9/2001 |
| WO | WO 92/04663 A1 | 3/1992 |
| WO | WO 99/28797 A1 | 6/1999 |

* cited by examiner

*Primary Examiner* — Boyer D Ashley
*Assistant Examiner* — Sara Addisu

(57) ABSTRACT

A control method for a tool machine is provided. The machine tool includes adjustment devices which are used to produce relative displacement between a machining head and a work piece. The adjustment movements are detected by sensors associated with the adjustment devices. A value for the relative displacement from the machining head to the work piece is determined from the signals of the sensors associated with the adjustment devices. The adjustment devices are controlled according to the value of relative displacement in order to produce predetermined adjustment movements. State variables which describe relative displacement between the machining head and work pieces are detected in at least one additional sensor. The state variables are taken into account when the value for the relative displacement is determined.

9 Claims, 1 Drawing Sheet

CONTROL METHOD FOR A MACHINE TOOL WITH NUMERICAL CONTROL

CROSS REFERENCE TO RELATED APPLICATIONS

This application is the US National Stage of International Application No. PCT/EP2005/053206, filed Jul. 5, 2005 and claims the benefit thereof. The International Application claims the benefits of German application No. 10 2004 033 119.7 DE filed Jul. 8, 2004, both of the applications are incorporated by reference herein in their entirety.

FIELD OF INVENTION

A control method for a machine tool provided with a numerical control, machine tool and also machining head and tool holder are provided.

The present invention relates to a control method for a machine tool with numerical control, a machine tool which is especially suited to executing such a control method, to a machining head for such a machine tool and also to a corresponding tool holder.

BACKGROUND OF INVENTION

The technique of clamping tools in a machining head is known. In such cases the machining head can for example consist of a milling head with a driven spindle and a chuck to hold the tool and the tool itself. To machine the workpiece a relative movement takes place between workpiece and machining head, the latter both being guided under numerical control along a programmed path relative to one another. For the purposes of controlling the guidance of the tool along the path, sensors are assigned to the adjustment devices for the adjusting displacements of the tool in relation to the workpiece, which sensors detect the adjustment movements from which the relative position of the tool or the relative displacement of the two objects to one another are determined. The adjustment devices are controlled depending on the relative displacement in order to create the predetermined adjustment movements. With a generally employed numerically controlled milling machine, for example, the movement of a milling tool clamped in the machining head relative to a workpiece held rigidly in a workpiece holder is determined as a relative displacement so that the desired predetermined shapes can be created on the workpiece. In this case the machining head includes the drive for the milling tool which is held at the end of a spindle in a chuck for example.

A disadvantage of such devices is that for measurement reasons the location (position and orientation) of the tool cannot be measured directly at the machining head but merely via the measured values of the sensors which are assigned to the adjustment devices. These are as a rule located away from the machining head. Because of the dynamic behavior between adjustment devices and machining head, there are variations in the open-loop or closed-loop controlled displacement of the feed axes and consequently undesired inaccuracies in the relative displacements to each other which adversely affect the accuracy of the machining and the ability to repeat the machining of the workpiece.

These variations can be partly countered by undertaking a precise calibration of the guidance of the machining head or of the workpiece when the machine is put into service or during setting-up and maintenance work. This type of setting-up and measuring work on the one hand demands high-precision and is especially time-consuming during the commissioning of machines. In addition it requires regular checking to ensure dimensional consistency over the long term.

SUMMARY OF INVENTION

An object of the invention is to improve the guidance of the tool and to make any setting-up work easier.

This object is achieved by a control method in accordance with the invention as well as by inventive machine tools, with inventive machining heads, workpiece holders and tools especially being able to be employed.

A control method for a machine tool with numerical control provides adjustment devices for creating a relative displacement between a machining head and a workpiece. The adjustment movements are detected with the sensors assigned to the adjustment devices. From the signals of the sensors assigned to the adjustment devices a value for the relative displacement of machining head to tool is determined. The adjustment devices are then controlled as a function of the value of the relative displacement in order to create predetermined adjustment movements. In accordance with the invention state variables which are used to describe the relative displacement between machining head and workpiece are detected in at least one additional sensor system, with the state variables being taken into account when determining the value for the relative displacement.

The state variables describe the behavior of the relative displacement of machining head and workpiece. Dynamic changes of this location are caused in particular by the adjustment movements per se, for example by the accelerations occurring. These lead to relative changes in position between the adjustment devices and the objects driven by the adjustment devices also in a different way from the pure adjustment movement to be created. By detecting of the state variables for the relative displacement it is possible to control the adjustment movements more accurately and thereby obtain enhanced machining accuracy. The value determined, which is defined taking into consideration the state variables, thus contains more precise information about the actual relative displacement compared to values derived for relative displacement determined solely from the sensors assigned to the adjustment device—which are used for detecting the adjustment movement created.

In this case, in an advantageous embodiment at least one of the state variables temperature, inclination, angular speed, angular acceleration, axial acceleration in at least one direction is detected. The detected state variables are then taken into account in determining the value for the relative displacement. The greater the number of state variables detected, the more accurately the relative displacement can be detected and determined, even when disruptive influences such as oscillations, acceleration forces, external vibrations, oscillations in the structure of the machine and temperature curve occur.

In this case in accordance with a preferred embodiment, the relative displacement is designed so as to detect both the position and the orientation of machining head to workpiece. The orientation especially includes the orientation of the machining head to the workpiece and thus the effect on the workpiece created during machining of the workpiece. The orientation takes account of the fact that both machining head and workpiece are not point-like objects but spatial networks.

The fact that at least the value for the relative displacement, but preferably also values of the state variables can be read out from the machine tool or its processing unit, enables these values, especially within the framework of remote diagnosis or remote maintenance of the machine tool, to be included and monitored as well. Conclusions about behavior and about faults occurring can be drawn especially from the state variables.

A machine tool with numerical control has adjustment devices for creating a relative displacement between a machining head and a workpiece. The sensors assigned to the adjustment devices detect the adjustment movements. In addition an evaluation unit is provided for determining a value for the relative displacement between machining head and workpiece. The adjustment devices can be activated under closed-loop control, it being possible to create predetermined adjustment movements. In accordance with the invention at least one additional sensor system is provided for detecting the state variables.

The additional sensor system makes it possible to detect additional variables over and above the detecting of the adjustment movements by the sensors. These state variables especially describe the actual behavior of the relative displacement of workpiece in relation to machining head of the machine tool. It is thus more accurate than drawing conclusions about a relative displacement solely by detecting the adjustment movements.

The adjustment devices especially consist of a number of adjusters which are each assigned to an adjustment movement. In this case each of the adjusters has a sensor arranged directly at the adjuster or in the immediate vicinity of the adjuster for detecting the adjustment movement created by this adjuster. This therefore essentially involves sensors which detect an axial displacement or a rotation (displacement sensors or angle sensors). The adjusters are generally electric motors, with rotation sensors being provided to control their operation, and in addition they can be employed as sensors for detecting the adjustment movement. Frequently however the sensor is an autonomous sensor separate from those of the adjusters. The sensors involved are preferably those which have a measurement resolution ranging down to a few µm and below.

The additional sensor system in accordance with a preferred embodiment of the invention is arranged on at least the element of the machine tool on which adjustment movements are created via the adjustment devices. If the machining head is movable in relation to the workpiece by adjustment movements, it at least has at least one additional sensor system. An additional sensor system can also be provided on the workpiece itself or also on the workpiece holder. An additional sensor system can consist of one sensor or a number of sensors which are accommodated in a common housing.

A machining head generally contains a tool and a drive source for the tool. In the case of a laser machine tool, the drive source involved is a laser source and the tool is the beam guidance and beam focusing means. With a drilling machine the drive source is an electric motor and the tool is a drill contained in a chuck. In this case the additional sensor system is then preferably arranged in or on the housing of the drive source. It is also possible to arrange an additional sensor system on the tool itself. Thus a plane or drill can very much contain sensors which measure forces as state variables and are included as additional sensor systems for determining the relative displacement.

In this case it is both possible for the adjustment devices only to create adjustment movements of one of the two elements machining head and workpiece and also for adjustment movements of both these elements to be created. If an adjustment movement is only created at one of the two elements, in accordance with an advantageous embodiment an additional sensor system can also be provided on the other element. At least one additional sensor system is provided on at least the element which executes adjustment movements.

In accordance with an advantageous embodiment of the invention at least one of the state variables temperature, inclination, angular acceleration, axial acceleration is detected.

Each of these variables is suitable for influencing the relative displacement of workpiece in relation to machining head. The angular acceleration or the angular speed has a direct influence on their orientation to each other. Accelerations and delays of the machining head or of a tool held and driven within it for example also have an influence on the relative displacement. In addition changes in the angular speed of the machining head for example can indicate that the working tip of the tool has reached the workpiece and thus also deliver information about the position of the tool tip, or can also cause a deflection of the tool tip which can be detected.

For example the axial acceleration of a drive spindle of a tool in the machining head can be detected in all three directions of the Cartesian coordinate system and thus offers an option of improving positional accuracy, since the acceleration and delay in the axial directions contain information about the different adjustment movements and adjustment paths of the machining head which were created by the adjustment devices. The temperature in the area of such a drive spindle enables temperature-dependent position changes over the length of the tool spindle to be compensated for example. In particular the temperature change of the tool itself during the machining has an influence on the position of the tool tip which machines the workpiece. By an appropriate detecting of the temperature a corresponding change of position can be compensated for or the position of the tool can be taken into account accordingly within the framework of control by the adjustment device.

In accordance with an advantageous embodiment of the invention, when the location is determined, the spatial orientation of the tool as well as its position is determined. Especially by measuring the acceleration values in the Cartesian coordinate system for example a spatial misalignment of the machining head in relation to a predetermined adjustment direction within the framework of the adjustment movements which are created by the adjustment device can be compensated for. A correction or compensation of the position of the tool head based on actual measured variables as opposed to that which corresponds to constructional expectations is thus possible. In particular installation and fabrication tolerances can be compensated for at least partly.

It accords with advantageous inventive embodiments if the machining head which is intended for use in a machine tool has at least one sensor system. The additional sensor system is preferably arranged protected in this case inside the housing of the machining head and integrated into the latter. It accords with a further inventive embodiment if a tool for a machining head has an additional sensor system.

In the same way it accords with an advantageous inventive embodiment if the tool holder has an additional sensor system. Providing the workpiece with this system would be desirable for reasons of measurement accuracy but is very expensive. It is thus more useful to equip the tool holder with an additional sensor system.

BRIEF DESCRIPTION OF THE DRAWINGS

The invention is also explained below in greater detail with reference to an exemplary embodiment shown in the drawing; the drawings show.

DETAILED DESCRIPTION OF INVENTION

Figure 1:
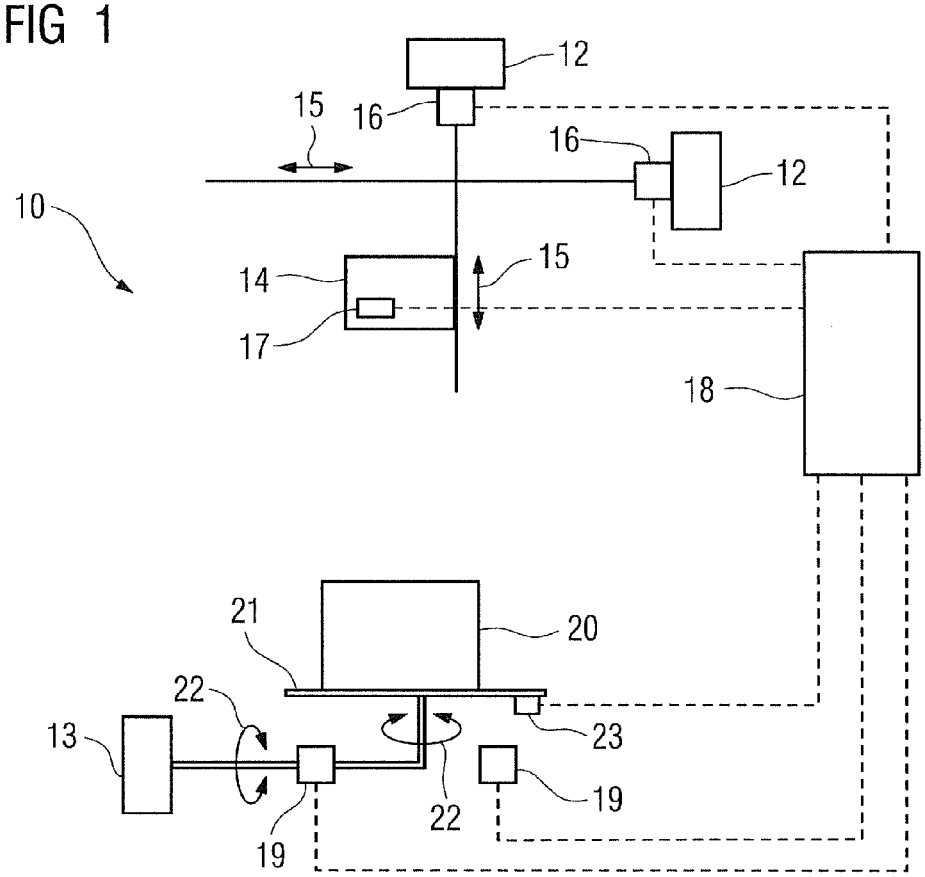
FIG. 1 the schematic diagram of a machine tool with a machining head.

FIG. 1 shows a machine tool 10 in which a machining head 14 is held in an adjustment device able to be moved in 2 directions. The workpiece 20 is held rigidly on the workpiece holder 21 in a defined position.

To carry out the machining of the workpiece 20, the machining head is able to be moved by adjustment devices 12 in the direction 15 which is indicated by a double arrow in each case. The adjustment devices 12 are for example devices such as linear drives. The workpiece 20 is oriented in relation to a tool (not shown) by swiveling the workpiece holder 21 by two directions of rotation 13 orthogonal to each other, of which the rotational movements are shown symbolically by the direction arrows 22. In the example shown, the workpiece 20 can be swiveled in two linearly independent directions and thus oriented in relation to the tool. Sensors 19 are provided for detecting movement of the workpiece 20 on the workpiece holder 21 by the adjustment device 13.

The sensors 16 are arranged at a distance from the actual position of the machining head 14, and these detect the movement of the tool by the adjustment devices 12. In such cases it is evident that the sensors 16 are not connected directly to the machining head 14 but are spatially and functionally removed from it and thus, as a result of the adjustment movements, the spatial relationship between them is not inevitably to be seen as fixed and able to be described without further process variables.

To remove these measurement inaccuracies and other measurement inaccuracies of which occur, the additional sensor system 17 for detecting the state variables of the machining head 14 and the additional sensor system 23 which detects state variables of the tool holder are provided.

The signals of all sensors 16, 19 and of the additional sensor system 17, 23 are fed to an evaluation unit 18, which determines the definition of relative displacement of the machining head 14 depending on the signals of the adjustment movements of the sensors 16, 19, the state variables from the signals of the additional sensor system 17 and the signals of the additional sensor system 23 and the numerical guidance in the sense of an open-loop or closed-loop control as regards the position of the machining head 14 in relation to the workpiece 20, by in particular controlling the adjustment devices 12, 13 in accordance with the creation of a predetermined setpoint position or setpoint displacement curve of the two elements to each other.

Figure 2:
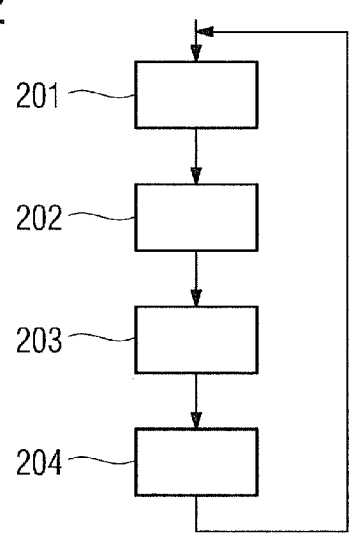
FIG. 2 the flowchart of an inventive method.

FIG. 2 shows a schematic diagram of the execution sequence of an inventive method.

In accordance with step 201 of the method, adjustment movements of the tool are detected by the sensors 16 19 on the basis of the adjustment devices 12, 13. In accordance with step 202, the state variables of the machining head 14 detected by the additional sensor system 17 as well as state variables of the workpiece detected by additional sensors 23 are fed to the control unit 18. In accordance with step 203, the relative displacement, especially as regards the position but also as regards the orientation of the tool in relation to the workpiece 20, is detected from this data.

In accordance with step 204, on the basis of the detected position and the specification of a setpoint location for the purposes of machining the workpiece 20 by the tool, the adjustment movements of the adjustment devices 12, 13 are controlled or regulated. The adjustment devices 12, 13 are controlled accordingly and the process returns to step 201.

The invention claimed is:

1. A machine tool, comprising:
   a machining head;
   a workpiece holder comprising a workpiece;
   an adjustment device to create a relative displacement between the machining head and the workpiece;
   a numerical control to control the adjustment device based upon a value of the relative displacement of the machining head to the workpiece;
   a sensor assigned to the adjustment device to detect adjustment movements of the adjustment device;
   additional sensors to create a state variable based upon a relative displacement between the machining head and the workpiece,
      wherein the machining head includes a first additional sensor and the workpiece holder includes a second additional sensor, and
      wherein the additional sensors are configured to detect measurement inaccuracies due to a dynamic behavior between the adjustment device and the machining head during a machining of the workpiece; and
   a value for the relative displacement between the machining head and the workpiece based upon signals of the sensor assigned to the adjustment device and based upon the state variable,
   wherein the state variable detected by the additional sensors is selected from the group consisting of: temperature, inclination, angular speed, angular acceleration, axial acceleration in at least one direction, and a combination thereof.

2. The machine tool as claimed in claim 1, wherein the sensor has a measurement resolution ranging down to at least a few μm.

3. The machine tool as claimed in claim 1, wherein the adjustment devices create adjustment movements of the machining head.

4. The machine tool as claimed in claim 1, wherein the additional sensor is integrated into the workpiece holder.

5. The machine tool as claimed in claim 1, wherein the adjustment device creates adjustment movements of the workpiece.

6. The machine tool as claimed in claim 1, wherein the additional sensor is integrated in the machining head.

7. The machine tool as claimed in claim 1, wherein the machine tool comprises:
   a machine bed, and
   a comparison sensor in the machine bed to detect state variables of the machine.

8. The machine tool as claimed in claim 7, wherein the comparison sensor and the additional sensor are detecting the same state variable.

9. The machine tool as claimed in claim 1, wherein the machine tool comprises an integrated additional sensor for detecting state variables.

* * * * *